United States Patent
Kingsmore, Jr. et al.

(10) Patent No.: US 7,378,755 B2
(45) Date of Patent: May 27, 2008

(54) SYSTEM AND METHOD FOR POWER APPLICATION TO AN INFORMATION HANDLING SYSTEM

(75) Inventors: Terry A. Kingsmore, Jr., Pflugerville, TX (US); Patrick Desbois, Austin, TX (US); Mohammed K. Hijazi, Austin, TX (US); Richard M. Tonry, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 499 days.

(21) Appl. No.: 11/096,132

(22) Filed: Mar. 31, 2005

(65) Prior Publication Data

US 2006/0220465 A1 Oct. 5, 2006

(51) Int. Cl.
*H02J 1/00* (2006.01)
(52) U.S. Cl. .................................................. 307/38
(58) Field of Classification Search ............... 307/38
See application file for complete search history.

(56) References Cited

U.S. PATENT DOCUMENTS

| 6,064,125 | A | 5/2000 | Stendardo et al. ............ 307/64 |
| 6,761,592 | B2 | 7/2004 | Wu .............................. 439/638 |
| 6,879,497 | B2 | 4/2005 | Hua et al. ..................... 363/16 |
| 7,242,111 | B2 * | 7/2007 | Menas et al. ................. 307/38 |

* cited by examiner

*Primary Examiner*—Robert L. DeBeradinis
(74) *Attorney, Agent, or Firm*—Hamilton & Terrile, LLP; Robert W. Holland

(57) ABSTRACT

An information handling system AC-to-DC adapter provides a low DC power output on initial application of an AC power input. The low DC power output supports communication between the adapter and the information handling system of adapter identification information. The information handling system confirms a proper connection with the adapter and sends an authorization to the adapter to output a high DC power output. The adapter monitors the connection with the information handling system to disable the high DC power output if not needed, such as if the information handling system is disconnected from the adapter or reaches a fully charged battery state.

16 Claims, 2 Drawing Sheets

SYSTEM AND METHOD FOR POWER APPLICATION TO AN INFORMATION HANDLING SYSTEM

BACKGROUND OF THE INVENTION

1. Field of the Invention

The present invention relates in general to the field of electrical power supply, and more particularly to a system and method for power application to an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically operate with alternating current (AC) power supplies that convert AC current into direct current (DC) for use by the components within the system. Desktop information systems typically have the power supply integrated internally in a housing so that a user need only plug the system into an AC socket and the power conversion occurs automatically. Portable information handling systems typically have an internal but removable battery that supplies DC power and an external power AC adapter that receives power from an AC socket, converts the power to DC and provides the DC power to a port of the information handling system. The AC adapter charges the battery and also provides external power to operate the system when the adapter is plugged in. AC adapter power supplies often have varying power capabilities and, if a system draws more power than the adapter is capable of delivering, the adapter may be damaged. To reduce the risk of damage, information handling systems attempt to identify the type of adapter in use and limit the power drawn from the adapter if the adapter has a limited capability. For instance, when an AC adapter is plugged into an information handling system, the information handling system sends a short pulse on the ground as an identification signal. The AC adapter responds with an identification code sent serially on the ground that identifies the type of adapter. If the AC adapter has limited power capacity, the information handling system throttles its performance, such as by inhibiting battery charging and processor speed, so that the power draw remains within the adapter's capacity.

Although AC adapter identification prevents excessive draw by an information handling system from an AC adapter, it does not actually affect the power output by the adapter itself. Thus, from the time that the AC adapter is plugged into an AC socket, the adapter is enabled to output DC power at its capacity. If, for instance, power and ground are inadvertently shorted on the output, damage to the system of shock to the user could occur. Also, with a large amount of current available from the adapter, an in-rush condition can occur when the adapter is plugged into the information handling system, potentially damaging the sensitive components within the information handling system. Indeed, the AC adapter is often itself built with sensitive and expensive components that are susceptible to damage. These more sensitive and expensive components are used so that power conservation standards are met. For instance, when an AC adapter is plugged into an AC socket but not an information handling system, the draw from the socket is required by government standards to be less than one Watt. Reduced idle power consumption requires higher performance components within the AC adapter.

SUMMARY OF THE INVENTION

Therefore a need has arisen for a system and method which restricts AC adapter output of DC power unless an authorized device is active at the DC power output.

In accordance with the present invention, a system and method are provided which substantially reduce the disadvantages and problems associated with previous methods and systems for supplying power to information handling systems. An adapter provides a low DC power on initial application of AC power to the adapter. The low DC power is used to communicate with the information handling system which authorizes output of a high DC power upon confirmation of a proper connection between the adapter and the information handling system.

More specifically, processing components of an information handling system, such as a CPU, RAM, hard disk drive and BIOS, are supplied with DC power from a power supply integrated in the housing of the information handling system. The power supply receives DC power from an external power adapter, which adapts external AC power into DC power for the power supply. Upon application of AC power to the power adapter, a low power module outputs a low DC power. A power source identification module in the power supply detects the low DC power and requests identification information from the power adapter. A power communication module of the power adapter sends the identification information, such as with pulsed signals sent on a ground wire or wireless communication. A power enablement module of the power supply authorizes output of a high DC power if the identification information confirms a proper connection between the information handling system and the adapter. A full power output module of the power adapter outputs full DC power once the power communication module receives authorization from the power enablement module. The power communication module monitors the connection with the information handling system to turn off the full power output module at a predetermined condition, such as a disconnection or a fully-charged battery indication from the information handling system.

The present invention provides a number of important technical advantages. One example of an important technical advantage is that an AC-to-DC adapter outputs only a low DC power unless a proper connection with an electronic device is confirmed, thus reducing the risk of a harmful shock to a user by the adapter, damage to the adapter from a short, or damage to the electronic device from a power surge. Inactivation of high DC power output in the event of a disconnection or fully charged battery allows the adapter to be built with less sensitive and expensive components while still maintaining minimal power use requirements for inactive adapters. The additional safety and reduced power consumption are achieved with backwards compatibility for existing adapters to work with newer systems since existing adapters will supply full DC power on initial connection without authorization from the device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Two-stage, soft-start information handling system power supply from a power adapter transitions from a low DC power to a high DC power based on an authorization provided from the information handling system to the adapter. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
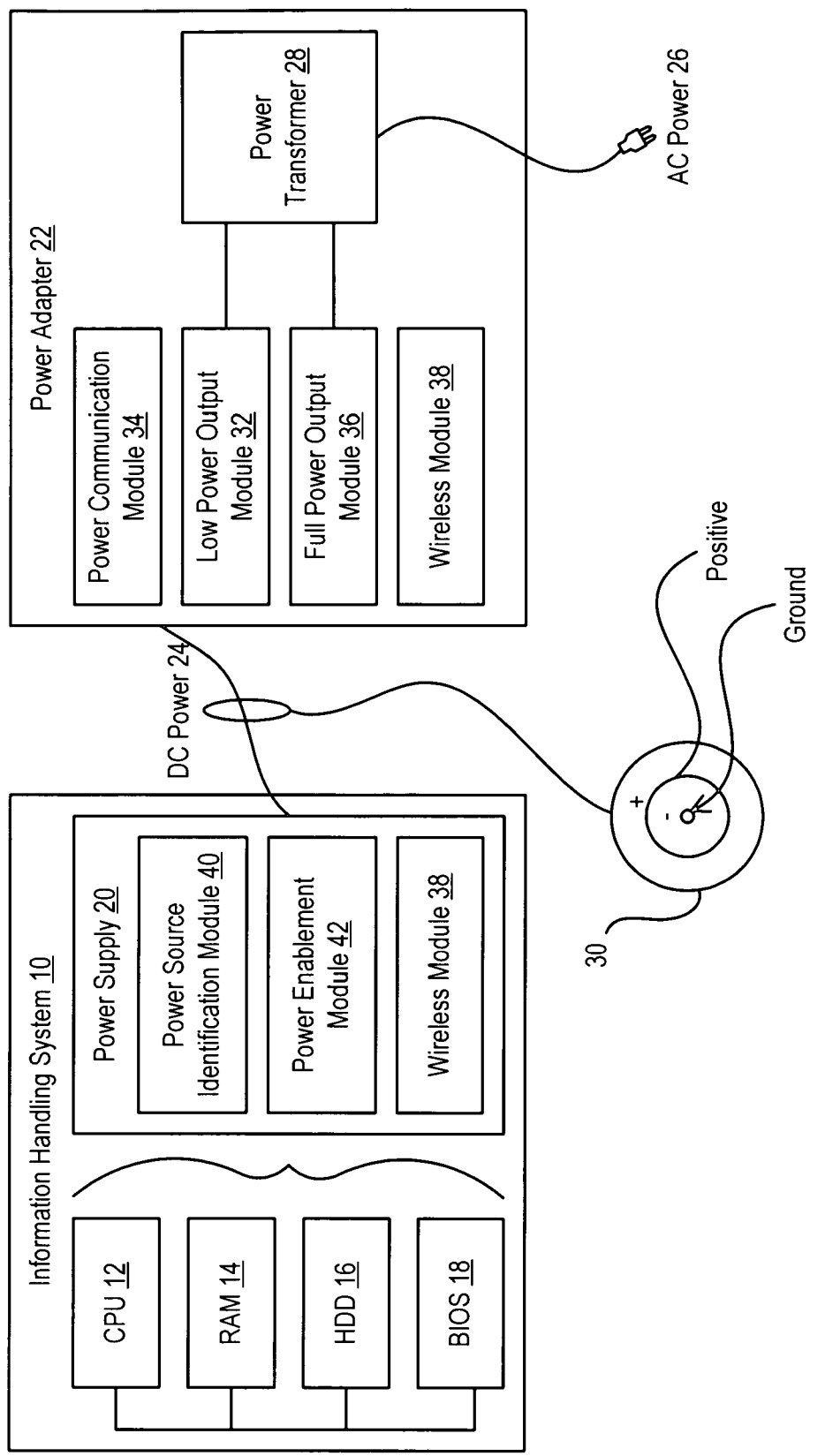
FIG. 1 depicts a block diagram of an information handling system and power adapter configured to work with low DC power and high DC power.

Referring now to FIG. 1, a block diagram depicts an information handling system and power adapter configured to work with low DC power and high DC power. Information handling system 10 processes information with a variety of processing components, such as a CPU 12, RAM 14, a hard disc drive 16 and BIOS 18. The processing components run using DC power supplied by a power supply 20. Power supply 20 receives DC power from a power adapter 22 through a DC power cable 24. Power adapter 22 receives AC power from an AC power cable and plug 26 and converts the AC power into DC power with a power transformer 28. As is depicted by a cutaway view 30, DC power cable 24 provides the DC power from power adapter 22 with a positive lead and a ground lead.

When power adapter 22 has AC power applied through AC cable 26, a low power output module 32 is activated to output a low DC power from power transformer 28. The low DC power output of module 32 is sufficient to operate electronic devices within power adapter 22 and to output a DC power current through cable 24 that has a low enough value that it presents little danger of shock to a user or damage to components from a short. Low power output module 32 provides power to a power communication module 34 of power adapter 22 that supports communication with information handling system 10. Upon receiving an authorization from information handling system 10, power communication module 34 allows full power output module 36 to output the full capable power through DC power cable 24. Full power output module 36 provides substantially all of the power capacity that is available from power transformer 28 in a normal operating mode. Power communication module communicates with information handling system 10 through serial signals sent through the ground of cable 24 or, alternatively, through a wireless module 38, such as a Bluetooth module.

Power supply 20 of information handling system 10 detects the low DC power output from cable 24 and initiates communication with power communication module 34. A power source identification module 40 sends a request to power communication module 34 for the identification of power adapter 22. Power communication module 34 responds with the identification information, which is verified by as valid by power source identification module 40. Once the power adapter identification is verified, a power enablement module 42 sends authorization to power communication module 34 to enable full power output module 36 to output full DC power. By limiting the output from power adapter 22 until authorization is received, cable 24 is confirmed as connected to information handling system 10, thus reducing the risk that the output of cable 24 will short out or shock a user. Power enablement module 42 disables the authorization for full power under some conditions; such as if the battery of information handling system is fully charged and the system is off. In such a condition, power adapter 22 is placed in a low power state by enabling only the low power output module 32, thus reducing power consumption. Similarly, power communication module periodically polls power enablement module 42 and, if no response is received, determines that cable 24 is disconnected. If cable 24 is disconnected, full power output module 36 is disabled to reduce the risk of shock from the full power output and to reduce the power consumption of adapter 22 when not in use to power information handling system 10.

Figure 2:
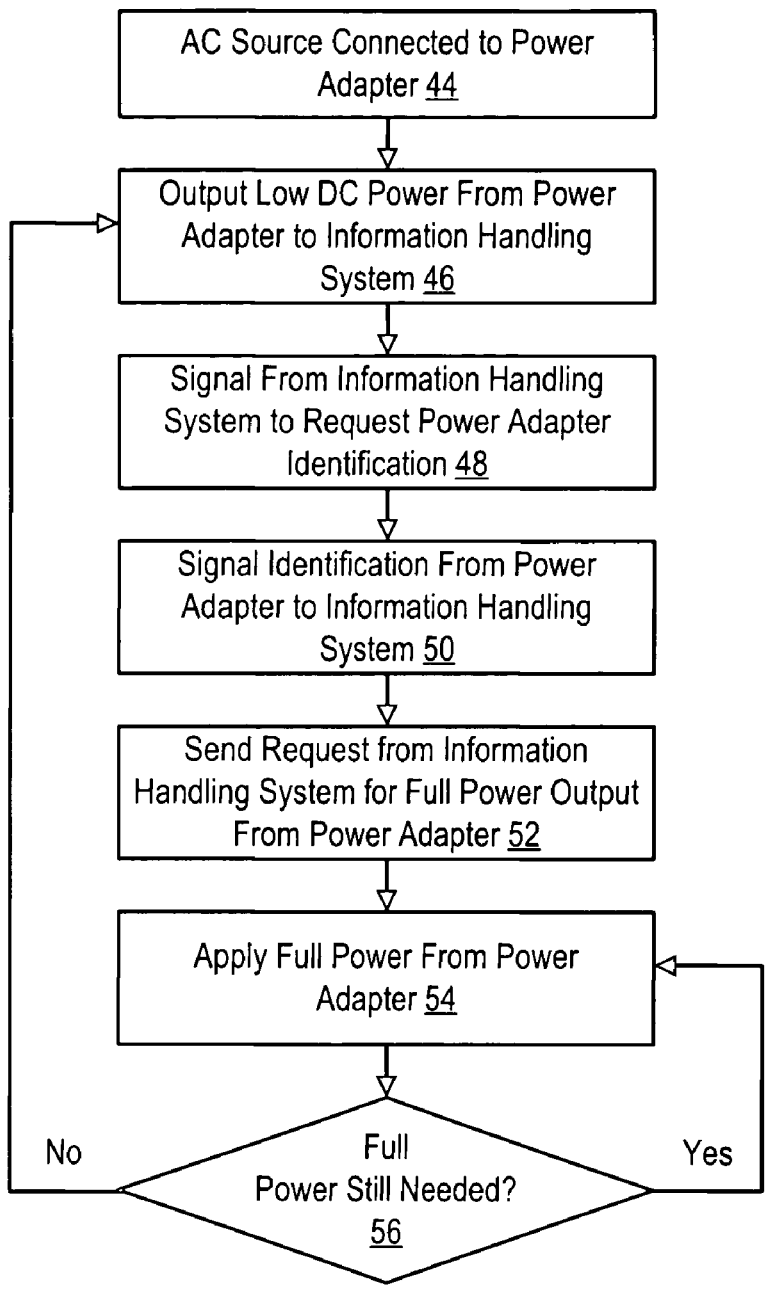
FIG. 2 a flow diagram of a process for transitioning from low to high DC power applied by an adapter to an electronic device.

Referring now to FIG. 2, a flow diagram depicts process for transitioning from low to high DC power applied by an adapter to an electronic device. The process begins at step 44 with connection of an AC power source to the power adapter. At step 46, the power adapter outputs a low DC power to an electronic device, such as an information handling system. At step 48, the information handling system detects the low DC power and sends a request to the power adapter for its identification information. At step 50, the identification information is sent from the power adapter to the information handling system, such as with serial pulses sent through the power cord ground. At step 52, the identification information is verified as valid and a request for full power output is sent from the information handling system to the power adapter. At step 54, full power is safely applied from the power adapter with the implicit confirmation that the power cord is properly connected to the information handling system. At step 56, the power adapter polls the information handling system to determine if full power is still needed. If so, then the process returns to step 54 for repeated polling. If full power is not needed, the process returns to step 46 to place the power adapter in the low power mode and await another signal for full power. Full power is not need if, for example, the power cable of the power adapter becomes disconnected or the information handling system is inactive with a charged battery. Going to the low power mode reduces power consumption while the adapter is not in use while maintaining the adapter in a standby state that allows recovery to full power when needed.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   plural processing components disposed in the housing and operable to process information;
   a power supply disposed in the housing and interfaced with the processing components, the power supply operable to provide DC power to the processing components; and
   a power enablement module associated with the power supply and operable to detect a first DC power current input from a power adapter, the power enablement module further operable to authorize a second DC power current from the power adapter by sending signals pulsed through a ground wire of the power adapter.

2. The information handling system of claim 1 further comprising:
   a power source identification module interfaced with the power enablement module, the power source identification module operable to communicate with the power adapter upon application of the first DC power current to identify the type of power adapter;
   wherein the power enablement module restricts the power adapter to the first DC power current until the power source identification module identifies the type of power adapter.

3. An information handling system comprising:
   a housing;
   plural processing components disposed in the housing and operable to process information;
   a power supply disposed in the housing and interfaced with the processing components, the power supply operable to provide DC power to the processing components;
   a wireless module operable to communicate with wireless signals; and
   a power enablement module associated with the power supply and operable to detect a first DC power current input from a power adapter, the power enablement module further operable to authorize a second DC power current from the power adapter;
   wherein the first DC power current is a relatively low output from the adapter and the second DC power current is a substantially full output from the adapter and the power enablement module authorizes the second DC power current by sending signals to the power adapter through the wireless module.

4. An information handling system comprising:
   a housing;
   plural processing components disposed in the housing and operable to process information;
   a power supply disposed in the housing and interfaced with the processing components, the power supply operable to provide DC power to the processing components; and
   a power enablement module associated with the power supply and operable to detect a first DC power current input from a power adapter, the power enablement module further operable to authorize a second DC power current from the power adapter;
   a power adapter external to the housing and operable to convert AC power to DC power for use by an information handling system;
   a power communication module associated with the power adapter and operable to communicate with the information handling system;
   a first power output module operable to output the first DC power current upon application of AC power to the power adapter;
   a second power output module operable to output the second DC power current upon communication of authorization for the second DC power current from the information handling system through the power commmunication module;
   wherein the first DC power current is a relatively low output from the adapter and the second DC power current is a substantially full output from the adapter; and
   wherein the power communication module periodically polls the information handling system for a predetermined power down condition, the communication module commanding the first DC power current instead of the second DC power current if the predetermined condition exists.

5. The information handling system of claim 4 wherein the predetermined condition comprises disconnection of the power adapter from the information handling system.

6. The information handling system of claim 4 wherein the predetermined condition comprises a fully battery charge of the information handling system.

7. A method for supplying power to an electronic system, the method comprising:
   accepting AC power at a power adapter;
   converting the AC power to a first DC power;
   providing the first DC power to the electronic system;
   receiving authorization for a second DC power from the electronic system;
   providing the second DC power to the electronic system;
   periodically polling by the power adapter for a predetermined power down condition; and
   reverting to the first DC power if the predetermined power down condition is detected.

8. The method of claim 7 wherein the predetermined condition comprises disconnection of the electronic device from the power adapter.

9. The method of claim 7 wherein the predetermined condition comprises a fully battery charge indication from the electronic system.

10. The method of claim 7 wherein the electronic system comprises a portable information handling system.

11. The method of claim 7 wherein the first DC power comprises a substantially low power and the second DC power comprises substantially full power.

12. The method of claim 7 further comprising:

requesting identification information by the electronic system from the power adapter;

sending the indentification information using the first DC power;

processing the identification information at the electronic system to authorize the second DC power; and sending from the electronic system the authorization for the second DC power.

13. A method for supplying power to an electronic system, the method comprising:

accepting AC power at a power adapter;

converting the AC power to a first DC power;

providing the first DC power to the electronic system;

receiving authorization for a second DC power from the electronic system with signal pulses sent across a ground wire connecting between the electronic system and the power adapter; and providing the second DC power to the electronic system.

14. A method for supplying power to an electronic system, the method comprising:

accepting AC power at a power adapter;

converting the AC power to a first DC power;

providing the first DC power to the electronic system;

receiving authorization for a second DC power from the electronic system by communication authorization with wireless signals sent between the electronic system and the power adapter; and providing the second DC power to the electronic system.

15. An AC-to-DC power adapter comprising:

an AC power plug operable to receive AC power from an AC power source;

a transformer operable to convert AC power to DC power;

a DC power plug operable to provide DC power to an electronic device;

a low power output module interfaced with the transformer and operable to output a low DC power from the transformer at the DC power plug;

a high power output module interfaced with the transformer and operable to output a high DC power from the transformer to the DC power plug; and a power communication module interfaced with the low power output module and the high power output module, the power communication module operable to communicate with the electronic device using the low DC power and to restrict output of high DC power by the high power output module until the electronic device sends authorization for high DC power, the power communication module further operable to detect disconnection of the information handling system from the DC power plug and to restrict output of high DC power by the high power output module if disconnection is detected.

16. The AC-to-DC power adapter of claim 15 wherein the electronic device is a portable information handling system.

\* \* \* \* \*